United States Patent Office 3,075,862
Patented Jan. 29, 1963

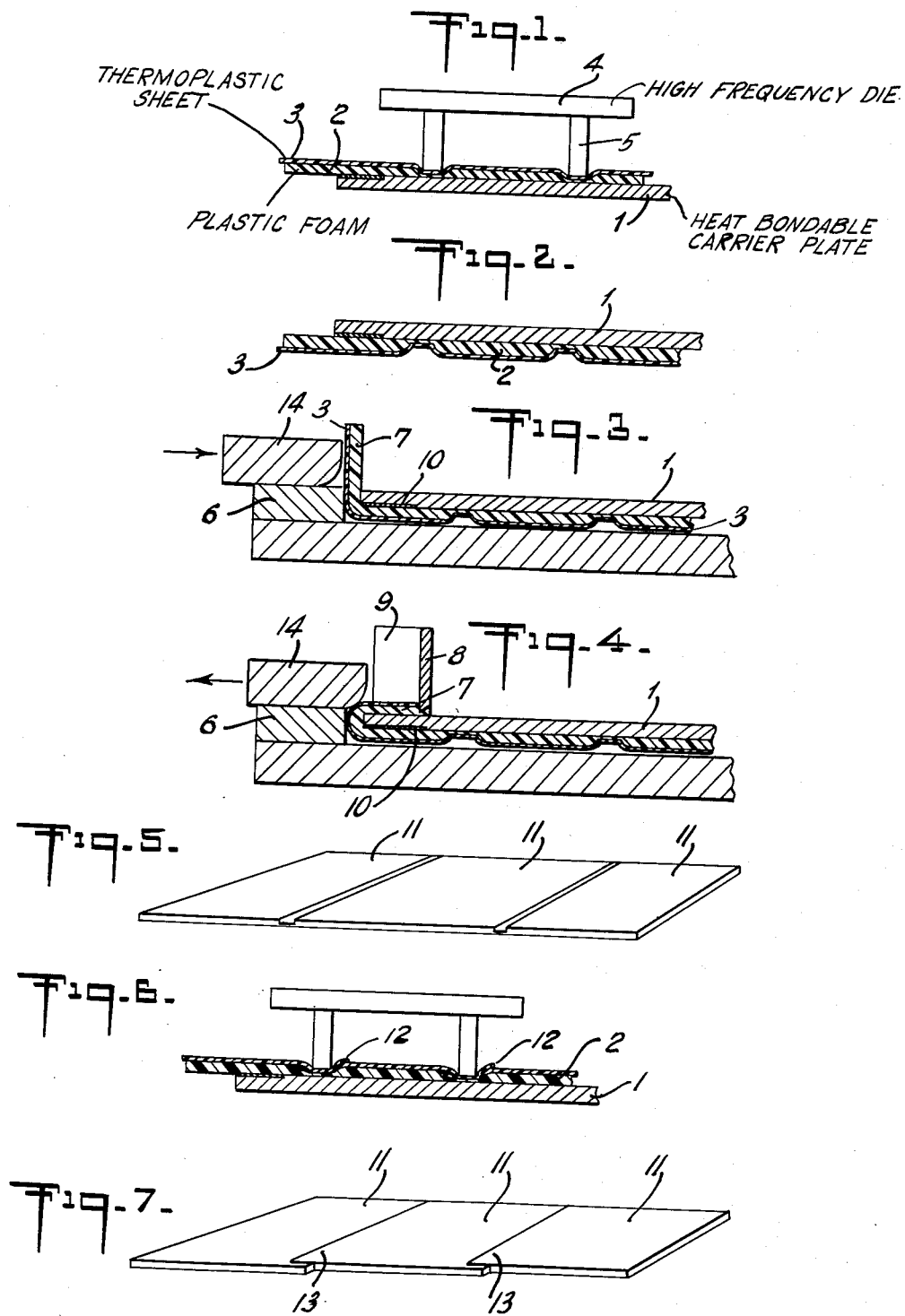

3,075,862
COVER PANELS AND METHOD OF MANUFACTURE
Ekkehard Hoyer, Wolfsburg, Germany, assignor to Volkswagenwerk Aktiengesellschaft, Wolfsburg, Germany
Filed Sept. 24, 1957, Ser. No. 685,853
Claims priority, application Germany Sept. 25, 1956
9 Claims. (Cl. 154—45.9)

My invention relates to cover panels and a method of manufacturing these, in general, and to such cover panels which are frequently employed for covering the interior of motor vehicles, boats, planes, the wall of a home, or commercial establishment, furniture, and the like, in particular. Methods of manufacturing such panels are at present still divided, for the most part, into a large number of predominantly manually performed steps. These methods are time-consuming, expensive and dependent on the worker's skill. It is known to employ for this purpose inserts of required pattern made of hard substance, such as cardboard, fiber board or plastic, and to cover the faces of such inserts with suitable materials, such as cloth, cord or plastic materials. The edges protruding over the pattern insert are secured on the backs of the latter, and where padding of the covering is provided, the proper distribution of such padding is achieved by quilt-like stitching. Today, plastic materials are being employed to a large extent as coverings, and it is already known to employ suitable plastic sheets in conjunction with a foam layer backing in manufacturing such cover panels.

An important object of my invention is therefore to provide such cover panels wherein plastic sheets are joined to the pattern insert in a simple and time-saving manner.

A further object of my invention is the provision of a method whereby such covering may be performed by mechanical, rather than manual means.

Another object of my invention is to provide a method whereby plastic materials, in particular sheets of polyvinyl chloride and a backing or padding of plastic foam or plastic fiber fleece may be welded directly to pattern inserts or carrier plates by high-frequency means.

Still another object of my invention is to provide a cover panel comprising a pattern insert or carrier plate to which has been welded a covering consisting of a sheet of plastic material and a backing or padding of plastic foam or plastic fiber fleece.

When inserts or carrier plates, which are made of a material not capable of being welded by high frequency welding, such as wood, cardboard, resin bonded fiber board (Hartfaser-platten) are used, they are made capable of being electronically welded, in accordance with my invention, by covering or coating them with a dissolved synthetic resin, such as polyvinyl chloride, at the required places.

Advantageously seam welding of two plastic sheets of different colors and kinds may be carried out, when these are not already of one piece, so that the simultaneous welding of these pieces and their seam adherence to the carrier plate may be effected. It is particularly advantageous, according to my invention, to carry out the attachment of the covering material on the back of the carrier plate by using separate high-frequency equipment. To this end, after the material has been welded to the face of the carrier plate, the protruding edges thereof are turned under the insert or carrier plate by inserting the latter in an appropriate form and finally placing a press pad on the back of the hard insert, whereupon, by means of an appropriate welding die, a welded edge seam is placed thereon. Obviously, the welding process may also be carried out in a single operation.

Marking of the back side weld on the face side of the covering is prevented by providing a condenser, usually required in high frequency welding on the carrier plate, in the form of a metal sheet on the carrier plate or by a metallic imprinting thereon. Plastic sheets and upholstery layers in the form of plastic foam or fiber fleece are joined to one another during the covering. However, a sheet, without padding may be welded directly to a carrier plate; and finally the carrier plate itself may be formed with a rough foam plate surface capable of being welded by high frequency means, so that padding material may be dispensed with in view of the padding properties of the rough foam plate itself.

Other objects and advantages of my invention will become apparent during the course of the following description.

It is to be understood, however, that the method and form of my invention are given only by way of illustration and not of limitation and that various changes in the steps or shape or arrangement of parts may be resorted to without departing from the spirit of my invention, or the scope of the subjoined claims.

In the accompanying drawing, wherein like numerals refer to like parts throughout the same:

FIG. 1 illustrates the step of welding covering material on the face of a carrier plate;

FIG. 2 is a cross-section of the covering before its insertion in a frame shown in FIG. 3.

FIG. 3 includes a cross-section of a carrier plate of an appropriate form;

FIG. 4 shows the folded-over edge of the covering pressed down and welded;

FIGS. 5 to 7 illustrate pieces of assembled material with welded seams at the overlapping sides.

Referring now to the drawings in detail: FIG. 1 shows a high-frequency weldable carrier plate 1 with an outline corresponding to the shape of the covering and covered with a predetermined amount of plastic foam or plastic fiber fleece layer 2, which layer extends past the carrier plate 1. The thickness of the layer is regulated according to the desired padding effect. On layer 2 is next superimposed a high-frequency weldable plastic sheet 3 of the same size and shape as foam material layer 2.

The layer of plastic foam or fleece 2 and sheet 3 can be joined together during the covering.

The carrier plate 1 may consist of a high-frequency weldable hard sheet, such as polyvinyl chloride or of a wooden board, resin bonded fiber board, cardboard, and the like, which have been made weldable by high-frequency means, as hereinbefore described.

The package or briquette 1, 2 and 3, thus formed, is introduced in a known manner into a high frequency welding press. The high frequency welding takes place in the press by means of electrodes 5 arranged at press die 4, which correspond with the shape and dimension of the desired seam.

Finally, the packet thus welded is turned by means of a suitable mechanism in such a manner that carrier plate 1, which was disposed under the plastic material will assume a position above the materials 2 and 3 (FIG. 3). The packet thus turned is pressed into a frame 6, by means of which the foam material and sheet portions 7, which extend beyond the carrier plate, are squared off, vertically and upwardly.

The vertically extending portion 7 is turned inwardly by means of a concentrically guided slide 14 (shown in part in FIGS. 3–4, and is impressed with cutting edges by vertically guided press pads 8.

Welding electrode 9, which is subsequently applied, effects a high-frequency weld on corresponding portions of the back of the carrier plate (FIG.4). If desired, welding electrode 9 may be joined to press pad 8. The edge is thus cut during the welding step. Alternately, the sheet portion 7 may be cut in a separate operation.

The portions extending beyond electrode 9 may be easily trimmed from the completed covered panel. The size of the covering sheet in a rectangular covering can be measured beforehand, so that the trim may easily fall off.

To prevent the electrodes from marking the face of the panel when the back thereof is being welded, care must be taken to provide appropriate means, such as a necessary condenser plate required for high-frequency welding, under the covering of carrier plate, i.e. between the plastic covering sheet and the plate. This may be accomplished by providing a metal sheet 10 (FIGS. 3 and 4), on the face of the carrier plate in the areas corresponding to the welds on the back of such plate or by imprinting or coating the carrier plate with metal. Marking of the carrier plate face may also be prevented by introducing a heat-reflecting sheet (not shown) between the face of the carrier plate and the covering, instead of metal sheet 10, thereby delaying the passage of heat to the face of the carrier plate.

It is possible, according to the method above described, to build up the manufactured cover panels in a variety of colors or designs. This may be accomplished by a previous high-frequency welding of the individual parts 11 of the covering as shown in FIG. 5, or by overlapping the various colors or kinds of the sheet covering as in the operation shown in FIG. 6, following which the overlapping edges 12 are cut off.

When a variety of sheets, which are already provided with padding material, are used in the covering operation, it is necessary to add an uncovered edge 13 (FIG. 7) of a width of 10 to 12 mm.

Instead of upholstery or padding material in the form of plastic foam or plastic fiber fleece, there may be employed a rough foam-surface plate, in which may be stamped, under pressure, ornamentation or stitching.

The method according to the invention lends itself appropriately to the introduction of plastic trim which may be used as edging. This may be done simultaneously with the seam welding operation or as an additional step. In such case, it is immaterial whether the trim is secured on the back of the carrier plate and has a protruding edge, whether it encloses the plate edge, or whether it is disposed forwardly, laterally or behind the carrier plate edge.

Having thus described my invention, I claim:

1. A cover panel suitable for motor vehicles comprising a high-frequency weldable carrier plate, a layer of plastic foam superposed thereon, and a plastic fabric sheet of high-frequency weldable material covering said foam, said foam and said plastic fabric sheet being joined together and through said foam joined to the front side of said carrier plate along depressed welding seams, and both said layer of plastic foam and said plastic fabric sheet having protruding edges turned over respective edges of the carrier plate and joined to the back of the plate along welding seams parallel to the seams on the front of the plate.

2. A panel as claimed in claim 1 containing a metallic layer between said plastic foam material and said carrier plate at the place opposite the welding seam at the back of said plate.

3. A cover panel according to claim 1, wherein said plastic fabric sheet comprises portions having various colors, said portions being welded together by high frequency.

4. A cover panel according to claim 1, wherein said plastic fabric sheet comprises portions having various designs thereon, said portions being welded together by high frequency.

5. A method of manufacturing a cover panel for motor vehicles, comprising providing a panel carrier plate of predetermined size and shape, said plate being of a material not weldable by high frequency, coating said plate with a high frequency weldable synthetic resin, applying a layer of plastic foam material to the face of the panel carrier plate, superimposing over said layer of plastic foam material a plastic fabric sheet, both said plastic foam material and said plastic fabric sheet being of a size slightly larger than said panel carrier plate and of substantially the same shape, whereby the edges of both said foam material and said plastic fabric sheet extend over corresponding edges of said carrier plate, bonding the sheet and the foam layer together and the foam layer to the face of said carrier plate by high frequency welding, turning the extending edges of said plastic foam material and said plastic fabric sheet over the corresponding edges of the carrier plate and simultaneously joining by high frequency heat all the edges thus turned over to the back of the panel carrier plate.

6. A method of manufacturing a cover panel for motor vehicles, comprising the steps of providing a high-frequency weldable panel carrier plate of predetermined size and shape, superposing a layer of plastic foam material on the carrier plate, superposing a plastic fabric sheet on the foam layer, both said plastic foam material and said plastic fabric sheet being of a size slightly larger than said panel carrier plate and of substantially the same shape, whereby the edges of both said foam material and said plastic fabric sheet protrude over the edges of said carrier plate, high frequency welding the sheet and the foam layer together and the foam layer to the face of the carrier plate, to thereby cover said face, turning the carrier plate so that the plastic sheet faces downwardly, inserting the carrier plate in a frame of a high-frequency welded to thereby square upwardly and vertically the protruding edges of the foam layer and plastic sheet, turning the edges of the foam layer and the plastic sheet over the edges of the carrier plate, die-cutting the edges so turned, high frequency welding said edges to the back of the carrier plate, and finally trimming the excess portions of the foam layer and the plastic fabric sheet.

7. Method according to claim 6, wherein the material of said carrier plate is polyvinyl chloride.

8. Method according to claim 6, wherein the steps of high frequency welding and die cutting the edges are performed simultaneously.

9. Method according to claim 6, wherein a metal condenser sheet is inserted between the plastic foam material and the carrier plate adjacent the edges thereof, to thereby prevent the scoring of the face of the cover panel when the back thereof is being welded.

References Cited in the file of this patent

UNITED STATES PATENTS

| | | |
|---|---|---|
| 2,072,603 | Mitchell | Mar. 2, 1937 |
| 2,542,702 | Prow | Feb. 20, 1951 |
| 2,550,455 | Davies | Apr. 24, 1951 |
| 2,621,142 | Wetherell | Dec. 9, 1952 |
| 2,631,646 | Gannon et al. | Mar. 17, 1953 |
| 2,638,963 | Frederick | May 19, 1953 |
| 2,660,660 | Hauteville | Nov. 24, 1953 |
| 2,686,556 | Gerber et al. | Aug. 17, 1954 |
| 2,705,522 | Kamborian | Apr. 5, 1955 |
| 2,758,631 | Peterson et al. | Aug. 14, 1956 |
| 2,781,818 | Beckman et al. | Feb. 19, 1957 |
| 2,792,320 | Bower | May 14, 1957 |

FOREIGN PATENTS

| | | |
|---|---|---|
| 706,109 | Great Britain | May 23, 1952 |